United States Patent
Bettencourt

[11] Patent Number: 5,890,719
[45] Date of Patent: Apr. 6, 1999

[54] COMBINATION METAL AND ELASTOMER CYLINDER HEAD GASKET

[75] Inventor: Alan C. Bettencourt, Solana Beach, Calif.

[73] Assignee: Parker-Hannifin Corporation, Cleveland, Ohio

[21] Appl. No.: 921,759

[22] Filed: Aug. 26, 1997

Related U.S. Application Data

[60] Provisional application No. 60/024,637 Aug. 27, 1996.

[51] Int. Cl.[6] ............................. F16J 15/12; F02F 11/00
[52] U.S. Cl. .......................................................... 277/599
[58] Field of Search ................................... 277/591, 592, 277/595, 599, 600, 601

[56] References Cited

U.S. PATENT DOCUMENTS

| | | | |
|---|---|---|---|
| 2,395,243 | 2/1946 | Aukers | 277/600 |
| 3,473,813 | 10/1969 | Meyers et al. | 277/601 |
| 3,499,655 | 3/1970 | Czernik et al. | 277/600 |
| 4,103,913 | 8/1978 | McDowell | 277/592 |
| 4,272,085 | 6/1981 | Fujikawa et al. | 277/599 |
| 4,331,336 | 5/1982 | Czernik et al. | |
| 4,405,138 | 9/1983 | Skrycki | 277/235 B |
| 4,534,572 | 8/1985 | Belter | 277/599 |
| 4,620,710 | 11/1986 | Lambert et al. | 277/235 B |
| 4,635,949 | 1/1987 | Lucas et al. | 277/595 |
| 4,915,398 | 4/1990 | Kitagawa | |
| 5,000,464 | 3/1991 | Yasui | 277/599 |
| 5,267,740 | 12/1993 | Stritzke | 277/235 B |
| 5,374,069 | 12/1994 | Pecina | |
| 5,439,234 | 8/1995 | Udagawa | |
| 5,490,681 | 2/1996 | Plunkett et al. | |
| 5,516,124 | 5/1996 | Kubouchi et al. | |

FOREIGN PATENT DOCUMENTS 499 551 A1 8/1992 European Pat. Off. .

OTHER PUBLICATIONS

Various literature of Fel–Pro Incorporated copyrighted 1992 and 1995 for Fel–Pro Honda Civic Head Gaskets.
Literature of Rol Mfg. Of Canada, Ltd. For High Temperature Head Gasket.
Literature of FP Diesel copyrighted 1994 for the BlueSeal Gasket.
Literature on Mr.Gasket's "Copper Head Gaskets" and Milodon Copper Head Gaskets.

Primary Examiner—Kenneth J. Dorner
Assistant Examiner—Marcus Dolce
Attorney, Agent, or Firm—John A. Molnar, Jr.

[57] ABSTRACT

A gasket for interposition between a cylinder head and block of an internal combustion engine. The gasket includes a metal retainer member having generally planar first and second surfaces with at least one cylinder bore opening formed therethrough for registration with a corresponding combustion chamber of the head and block, and at least one fluid port opening formed therethrough for registration with a corresponding passageway of the head and block. One or more elastomeric members are attached to the retainer about a corresponding one of the fluid port openings. Each of the elastomeric members has a seal portion extending along the periphery of the fluid port opening for sealing the corresponding passageway, and a diaphragm portion extending from the seal portion at least partially over the fluid port opening for covering at least a portion of the corresponding passageway.

12 Claims, 4 Drawing Sheets

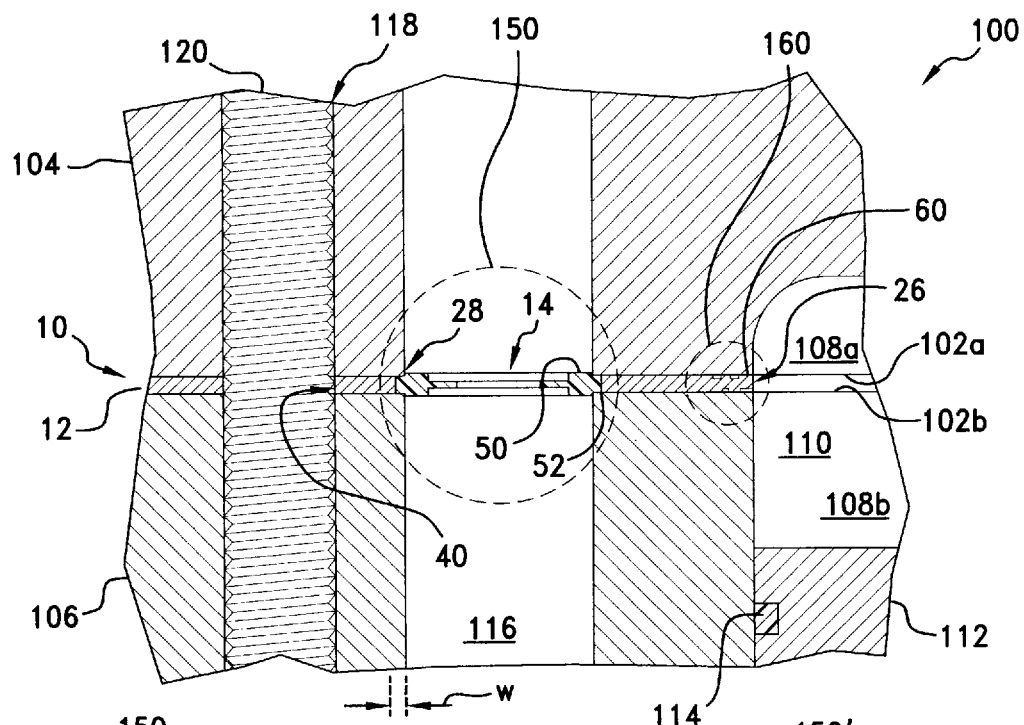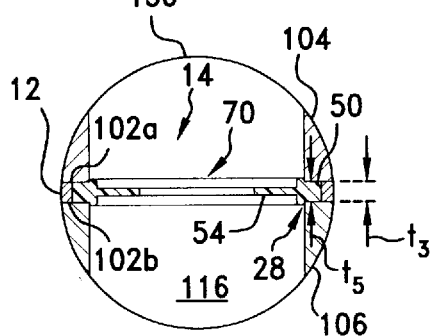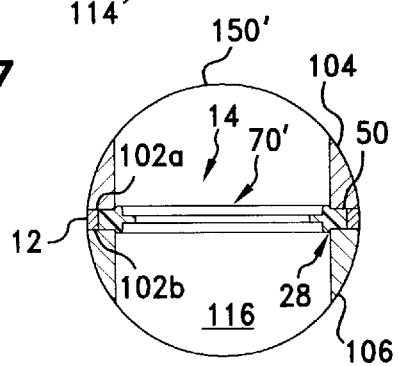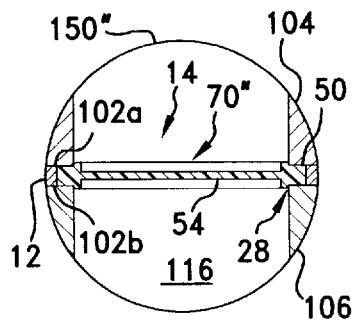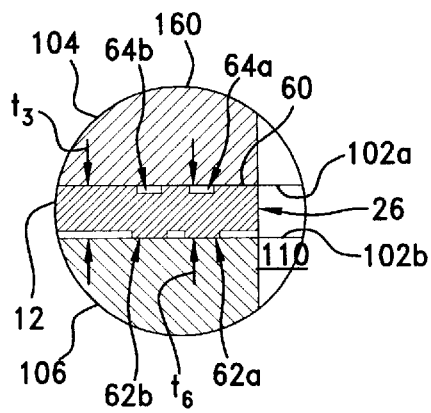

COMBINATION METAL AND ELASTOMER CYLINDER HEAD GASKET

This application claims the benefit of U.S. Provisional Application No. 60/024,637 filed Aug. 27, 1996.

BACKGROUND OF THE INVENTION

The present invention relates broadly to a gasket for sealing between the cylinder head and block of an internal combustion engine, and particularly to a gasket construction including elastomeric members attached to a metal retainer for sealing about the fluid port openings of the engine.

Head gaskets are employed in internal combustion engines as interposed for compression between the mating surfaces of the cylinder head and block for effecting the fluid-tight sealing thereof. In basic construction, gaskets of such type are conventionally constructed of a generally planar member formed of one or more layers of fiberboard, graphite, and/or a metallic material such as copper, steel, aluminum, or the like. Within the planar member are formed a plurality of apertures for registration with the corresponding bores and fluid passageways of the cylinder head and block. A circular fire or combustion ring formed of a metal wire or the like typically is provided about the circumference of the cylinder bores for effecting a combustion seal.

For example, Meyers et al., U.S. Pat. No. 3,473,813, discloses a cylinder head gasket which includes a metal plate having cylinder bore, lubricating port, and coolant port openings. Elastomeric seals are seated for retention within the lubricating and fluid port openings. The location and size of each of the seals is such that the internal diameter thereof corresponds to and registers with its associated port opening. Concentric fire rings, each formed of a one-piece steel wire clad with a non-ferrous material, are located within each of the cylinder openings.

Fujikawa et al., U.S. Pat. No. 4,272,085, discloses another cylinder head gasket which includes a metal plate having coolant port openings about the peripheries of which an elastomeric seal ring is bonded. Corrugations are formed within the plate about the peripheries of the cylinder bore openings to improve the compressive sealing thereof.

European Patent No. 499,551 discloses another cylinder head gasket formed of a metal core having coolant and lubricant openings which are sealed with an elastomeric ring. A series of ribs and grooves are formed about the peripheries of the cylinder bore openings.

Kitagawa, U.S. Pat. No. 4,915,398, discloses a cylinder head gasket formed of a metallic plate. The plate includes embossments formed around the cylinder bore openings which are deformable under compression for equalizing the forces acting thereon. Udagawa, U.S. Pat. No. 5,439,234, discloses another metal head gasket having sealing beads or corrugations which are integrally-formed around the cylinder bore and fluid port openings thereof.

Pecina, U.S. Pat. No. 5,374,069, discloses a cylinder head gasket formed of an aluminum core faced with upper and lower layers of an elastomeric material. The material is a blend of a synthetic elastomer such as rubber or silicone and a filler such as aramid fibers or clay.

Kubouchi et al., U.S. Pat. No. 5,516,124, discloses a head gasket formed of an elastic metal plate. Beads are formed about the cylinder bores for equalizing the face-to-face pressure in the vicinity thereof.

Czernik et al., U.S. Pat. No. 4,331,336 discloses a cylinder head gasket formed of a multi-layered plate having cylinder bore openings bounded by circular wire fire rings. The plate is a laminate of a central metallic core interposed between outer sheets of an impregnated or elastomeric asbestos material. The gasket is recompressed prior to its installation in an engine. Gaskets of such type, as well as other metal, rubber, and fiber gaskets, are marketed commercially by Fel-Pro Inc., of Skokie, Ill.

Plunkett et al., U.S. Pat. No. 5,490,681 discloses a multi-layered gasket comprising an inner plate interposed between a pair of outer plates. The outer plates are shaped to form sealing beads about the cylinder bore and fluid port openings thereof. The inner plate is shaped to form a flange which provides a combustion seal about the cylinder bore openings.

Copper head gaskets marketed commercially by Mr. Gasket of Cleveland, Ohio, and by Milodon, Inc., of Chatsworth, Calif. A gasket having a molybdenumpolytetrafluoroethylene coating and a wire combustion seal is marketed by FP Diesel L.P., Huntington Beach, Calif. Another gasket including a graphite-faced steel core, stainless steel fire rings, a silicone outer coating, and sealing beads is marked by ROL Mfg., of Quebec, Canada.

The above-described references heretofore have constituted the state of the art with respect to cylinder head gaskets. It will be appreciated, however, that continued improvements in such gaskets would be well-received by the automotive industry for use as original and replacement equipment in passenger cars, and by enthusiasts for use in racing and other high performance applications. A preferred gasket construction would be economical to manufacture, but would exhibit excellent sealing with a minimum of compression set. Such a gasket additionally would be capable of withstanding prolonged exposure to high temperatures as well as to hydrocarbons and other fluids within the rigorous service environment of an internal combustion engine.

BROAD STATEMENT OF THE INVENTION

The present invention is directed to a cylinder head including a metal retainer and elastomeric members attached to the retainer for sealing the fluid port openings thereof. In forming the elastomeric members as having a seal portion which extends about the periphery of the fluid port opening, and a diaphragm portion which extends from the seal portion at least partially over the fluid port opening, a fluid-tight sealing of the corresponding fluid passageway of the engine is ensured. Moreover, by controlling the size of the port opening through of the seal member as defined by the extent of the diaphragm portion thereof, the flow of fluid such as coolant through the passageway may be metered for effecting uniform cylinder head temperatures.

It therefore is a feature of the present invention to provide a gasket for interposition between a cylinder head and block of an internal combustion engine. The gasket includes a metal retainer member having generally planar first and second surfaces with at least one cylinder bore opening formed therethrough for registration with a corresponding combustion chamber of the head and block, and at least one fluid port opening formed therethrough for registration with a corresponding passageway of the head and block. One or more elastomeric members are attached to the retainer about a corresponding one of the fluid port openings. Each of the elastomeric members has a seal portion extending along the periphery of the fluid port opening for sealing the corresponding passageway, and a diaphragm portion extending from the seal portion at least partially over the fluid port opening for covering at least a portion of the corresponding passageway.

It is a further feature of the invention to provide a method of metering the flow of a fluid through a cylinder head and block of an internal combustion engine. The method entails providing a gasket which includes a metal retainer member having one or more elastomeric members. The retainer member has one or more fluid port openings formed therethrough as configured for registration with a corresponding passageway of the head and block. Each of the elastomeric members is attached to the retainer about a corresponding fluid port opening as having a seal portion extending along the periphery of the fluid port opening for sealing the corresponding passageway, and a diaphragm portion extending from the seal portion at least partially over the fluid port opening. The gasket is interposed between the interface surfaces of the cylinder head and block such that at least a portion of each respective passageway is covered by a corresponding diaphragm portion to effect the metering of the fluid flow through the passageway. The gasket then is compressed between the interface surfaces effective for sealing each respective passageway.

Advantages of the present invention include a combination metal and elastomer cylinder head gasket which exhibits a high seal stress around the cylinder bore openings for improved sealing properties with a minimum of compression set and torque loss. Additional advantages include a gasket which is economical to manufacture, and which is capable of withstanding prolonged exposure to the high temperatures, high pressures, and fluids such as hydrocarbons found within the rigorous service environment of an internal combustion engine. These and other advantages will be readily apparent to those skilled in the art based upon the disclosure contained herein.

BRIEF DESCRIPTION OF THE DRAWINGS

For a fuller understanding of the nature and objects of the invention, reference should be had to the following detailed description taken in connection with the accompanying drawings wherein:

FIG. 7 is fragmentary, enlarged, cross-sectional view of the gasket of FIG. 1 as interposed between the interface surfaces of a cylinder head and block of an internal combustion engine;

FIGS. 7A–C are enlarged view of a section of the assembly of FIG. 7 showing alternative embodiments of the elastomeric member in enhanced detail as illustrative of the fluid metering feature of the present invention; and FIG. 7D is an enlarged view of another section of the assembly of FIG. 7 showing the combustion seal feature of the present invention in enhanced detail.

The drawings will be described further in connection with the following Detailed Description of the Invention.

DETAILED DESCRIPTION OF THE INVENTION

Figure 1:
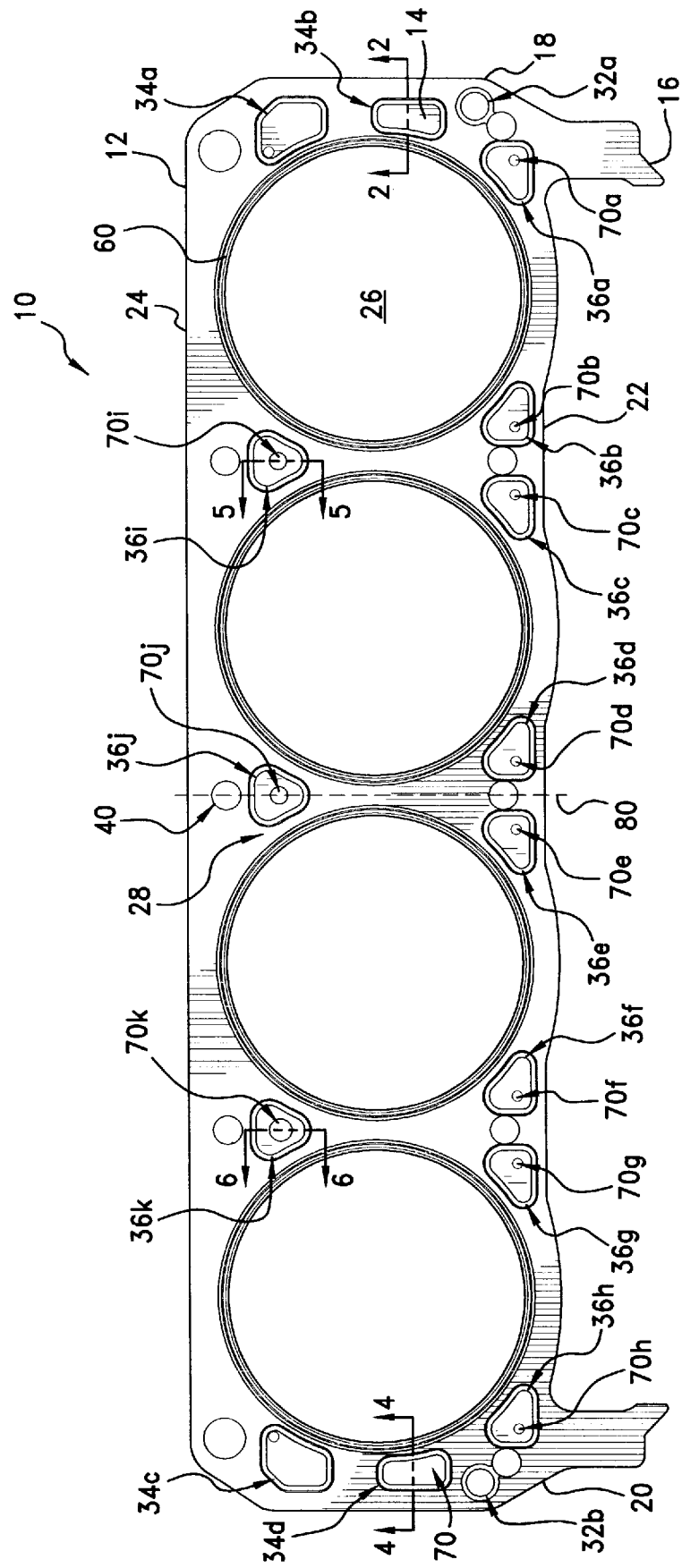
FIG. 1 is a plan view of a combination metal and elastomer cylinder head gasket shown in accordance with the present invention as having a metal retainer member with integral combustion rings and fluid port openings, and as having perforate or imperforate elastomeric members attached to the fluid port openings.

Referring then to the figures wherein corresponding reference characters are used to designate corresponding elements throughout the several views, shown generally at 10 in FIG. 1 is representative cylinder head gasket according to the present invention. Gasket 10 includes a generally planar, metal retainer member, 12, and one or more elastomeric members, one of which is referenced at 14, attached thereto.

Retainer member 12 is configured for interposition between the interface surfaces of a cylinder head and block (FIG. 7) of an internal combustion engine as having an outer margin, 16, which corresponds to the outer margins of those surfaces. Depending upon the orientation of the cylinder head and block within the engine and the relation of that orientation to certain engine components such as the water or coolant pump, outer margin 16 may be define as having a forward end, 18, and a rearward end, 20, as well as intake and exhausts sides 22 and 24, respectively.

Cylinder heads and blocks of type herein involved are conventionally formed as having a plurality of cylinder bores which mate to define the typically hemispherically-shaped combustion chambers of the engine, and one or more throughbore passageways which define a manifold for the parallel flow of coolant and lubrication fluids such as air, water, antifreeze, and oil through the engine. In this regard, retainer member 12 includes one or more cylinder bore openings, one of which is referenced at 26, each configured for registration with a corresponding combustion chamber of the engine, and one or more fluid port openings, one of which is referenced generally at 28, each configured for registration with a corresponding passageway of the engine. In the gasket arrangement illustrated in FIG. 1, fluid port openings 28 are provided as conventionally defining oil drain back port openings, shown in phantom at 32a–b, forward and rearward end coolant port openings, shown in phantom at 34a–b and 34c–d, respectively, and intake and exhaust side coolant port openings, shown in phantom at 36a–h and 36i–k, respectively. It will be appreciated that the openings and holes through retainer member 12 generally correspond in number and arrangement to those formed within the interface surfaces of the cylinder head and block.

Retainer member 12 additionally is formed as including one or more bolt holes, one of which is referenced at 40, for receiving the head bolts (FIG. 7) or other fasteners therethrough which are conventionally employed for fastening the cylinder head to the block under a predetermined amount of torque. In this regard, as registered intermediate the interface surfaces of the cylinder head and block, gasket 10 of the present invention is compressible under the torque of the head bolts to effect a fluid tight sealing of the combustion chambers and fluid passageways of the engine.

Figure 2:
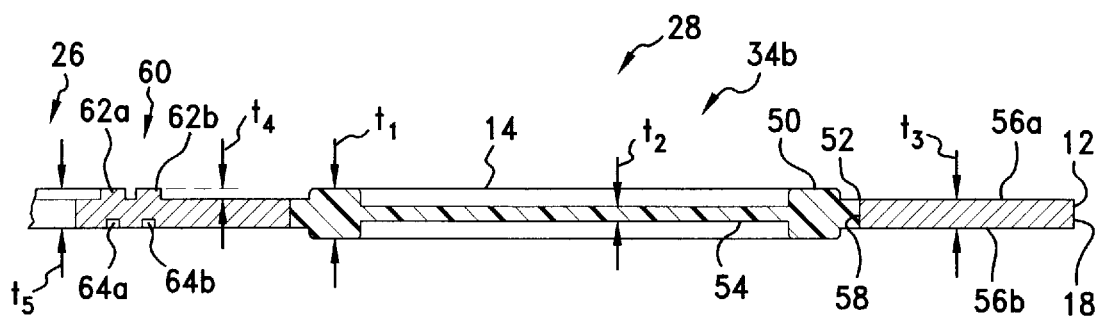
FIG. 2 is a fragmentary, enlarged, cross-sectional view of the gasket of FIG. 1 taken through plane 2—2 of FIG. 1 and showing a combustion ring and an imperforate elastomeric member in enhanced detail.

Looking next to FIG. 2, the details of the gasket construction of the present invention are revealed via the enlarged cross-sectional view taken though representative cylinder bore and fluid port openings, namely, cylinder bore opening 26, and coolant port opening 34b. In accordance with the precepts of the present invention, an elastomeric member 14 is attached to opening 34b for effecting the fluid-tight sealing of the engine fluid passageway corresponding therewith. Elastomeric member 14 is integrally formed as having a relatively thick annular seal or bead portion, 50, which extends along the outer periphery, 52, of opening 34b, and a relatively thin diaphragm portion, 54, which extends from and centrally between the seal portion 50 for covering at least a portion of the corresponding engine passageway (FIG. 7).

Typically, seal portion 50 is provided as having a nominal cross-sectional thickness, referenced at $t_1$, that is from about 10–40 mils greater than the corresponding cross-sectional thickness, referenced at $t_2$, of diaphragm portion 54. For effecting a fluid-tight sealing of the engine passageway, seal portion 50 additionally is provided to be elastically compressible between the interface surfaces of the engine. Accordingly, it is preferred that seal portion cross-sectional thickness $t_1$ is from about 10–20 mils thicker than the corresponding nominal cross-sectional thickness, referenced at $t_3$, of retainer member 12.

Figure 3:
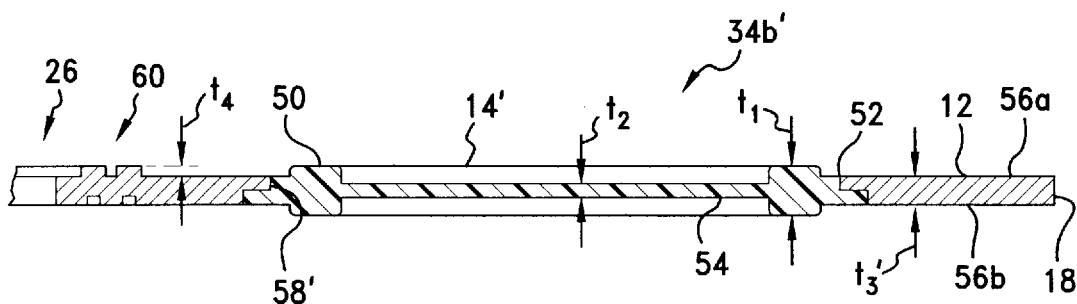
FIG. 3 is a fragmentary cross-sectional view of a combustion ring and elastomeric member of an alternative embodiment of the gasket of FIG. 1.

Configured as shown, retainer member 12 has generally planar first and second surfaces, 56a and 56b, through which cylinder bore openings 26 and fluid port openings 28 are formed. Depending upon the thickness $t_3$ of retainer member 12, the outer periphery 52 of opening 34b may be configured, as is shown, as defining an inner surface, 58, which is disposed generally perpendicularly to surfaces 56 of retainer member 12. Alternatively, and as may be seen with momentary reference to FIG. 3 wherein coolant port opening 34b reappears at 34b', inner surface 58 may be formed as having the stepped configuration referenced at 58'. Such configuration of inner surface 58 provides increased area for the attachment of the seal member referenced at 14' thereto, and thereby facilitates the provision of a relatively thin retainer member having a cross-sectional thickness $t_3$' of about 20 mils or less.

Further in this regard, it will be appreciated the nominal thickness of retainer member 12 may be tailored for the specific application which the gasket is intended. That is, it is well-known that the motive power of an internal combustion engine is determined by the compression ratio of the cylinders which, in turn, is inversely proportional to the volume displacement of the cylinders. Accordingly, by varying the thickness of the head gasket, the compression ratio may be increased or decreased as the application dictates. For example, higher compression ratios are known to provide increased power and better fuel efficiency, with lower compression ratios known to provide lower power but reduced pre-ignition and knocking, particularly in supercharged or nitrous oxide-fed high performance engines. The described construction, as a precept of the present invention, advantageously facilitates the manufacture of a gasket for any particular engine application in a wide range of nominal thicknesses.

Returning to FIG. 1, retainer member 12 may be seen to further include integral combustion or fire ring portions, one of which is referenced at 60 as describing the outer periphery of corresponding cylinder bore opening 26. Preferably, retainer member 12 is formed as having an integral combustion ring portion 60 circumscribing each cylinder bore opening 26. Combustion ring portions are compressible between the interface surfaces of the cylinder head and block for effecting a fluid-tight seal of each corresponding combustion chamber of the engine.

As may be seen in the cross-sectional view of FIG. 2, combustion ring portions 60 each are configured as having at least one, and preferably a pair of upstanding bearing surfaces, such as the concentric inner and outer circular surfaces 62a and 62b shown, extending from planar surface 56a of retainer member 12. Ring portions 60 further may be configured as having at least one, a preferably a pair of channels, such as the concentric inner and outer channels referenced at 64a and 64b, recessed into the opposing planar surface 56b of retainer member 12. Ring portions 60 thereby are configured to exhibit a reduced yield stress as compared to the remainder of retainer member 12 and, accordingly, to be deformable for conforming to any irregularities between the interface surfaces of the cylinder head and block of the engine. In this regard, as a given compressive load is applied by the tightening of bolts which fasten the head to the block, an increased bearing stress is provided about the cylinder bore openings by virtue of the reduced surface area contact of bearing surfaces 62 on one of the interface surfaces of the engine. This increased stress is sufficient to exceed the reduced yield stress of ring portions 60 to effect the deformation thereof for improved an metal-to-metal contact effecting the fluid-tight sealing of the combustion chambers. By providing a pair of bearing surfaces 62 as shown, this sealing is effected over a wider surface area and thereby minimizes the potential for a pressure boundary to be penetrated by a sealing defect.

For gasket 10 of the invention to acceptably seal the interface surfaces of the engine, a fraction of the load imposed on the gasket under the applied compressive forces developed from the torquing of the head bolts must be distributed in each of the sealing zones of the gasket. Accordingly, each of bearings surfaces 62 typically will be provided to have a thickness, referenced at $t_4$, which extends about 10 mils or more from planar surface 56a of retainer member 12. The overall maximum thickness, referenced at $t_5$, of retainer member 12, however, typically will be from about 2–20 mils less than the thickness $t_1$ of seal portion 50 of each elastomeric member 14. In this way, an optimum load balance may be attained which distributes increased sealing stresses on both combustion gas seals 60 and fluid seals 14. That is, while under compressive loading, seal portions 50 of elastomeric members 14 are preloaded for an initial compression to the thickness $t_5$ of retainer member 12, and ultimately to the thickness $t_3$ of retainer member 12.

Advantageously, the described configuration of elastomeric member 14 of the present invention provides a gasket construction with a fluid metering feature which may utilized to effect a more uniform cylinder head temperature distribution. In this regard, with respect to the parallel, one-directional coolant flow from the cylinder block to the cylinder head, it is known that a pressure drop is developed as between, for example, the forward passageways disposed nearer the pressure head of the coolant system pump and the rearward passageways which are disposed farther from that pump. Such pressure drop is known to result in a non-uniform temperature distribution within the engine, the effects of which are more pronounced with respect to the fluid passageways in the hotter exhaust side of the engine.

Figure 4:
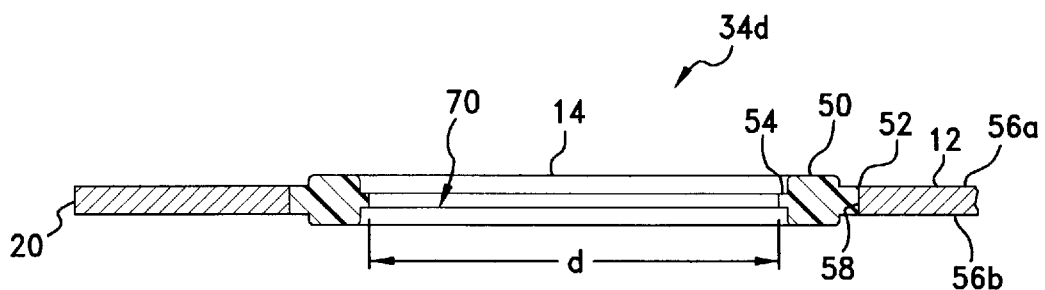
FIG. 4 is a fragmentary, enlarged, cross-sectional view of the gasket of FIG. 1 taken through plane 4—4 of FIG. 1 and showing a perforate elastomeric member in enhanced detail.

As may be appreciated with general reference to FIG. 1, the elastomeric members 14 of each corresponding fluid port opening 26 may be formed as being either imperforate for blocking the flow of fluid through the corresponding passageway, or perforate for defining a port of predetermined diametric extent through the passageway. In the illustrated embodiment, forward end cooling port opening 34b is shown as being imperforate, with counterpart rearward end opening 34d shown as being perforate to define a port, referenced at 70 therethrough. As may be seen in the cross-sectional view of forward end opening 34b shown in FIG. 2, diaphragm portion 54 extends inwardly from seal portion 50 to completely cover the entirety of the opening. In contrast, and as may be seen with reference to FIG. 4, diaphragm portion 54 of rearward port opening extends inwardly from seal portion 50 to cover only a portion of the opening in defining port 70 having a diameter, d.

Figure 5:
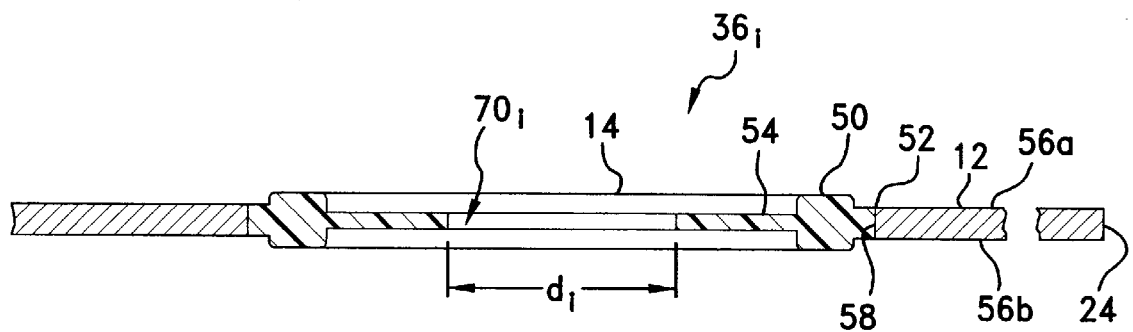
FIG. 5 is a fragmentary, enlarged, cross-sectional view of the gasket of FIG. 1 taken through plane 5—5 of FIG. 1 and showing another perforate elastomeric member as defining a first fluid port of predetermined diametric extent.
Figure 6:
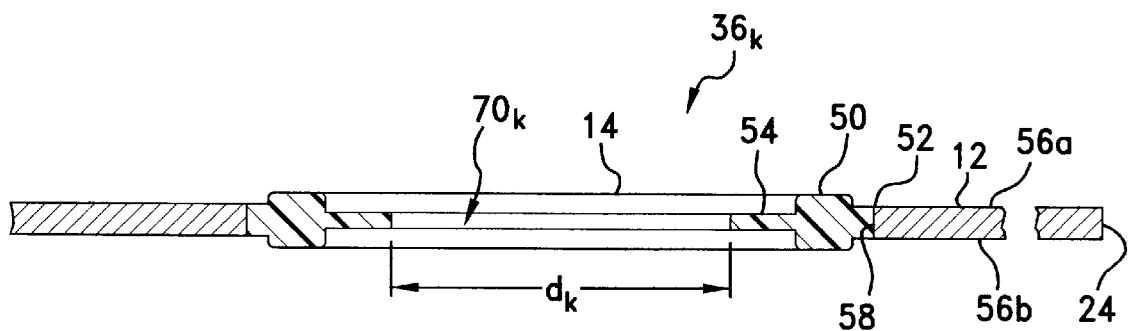
FIG. 6 is a fragmentary, enlarged, cross-sectional view of the gasket of FIG. 1 taken through plane 6—6 of FIG. 1 and showing another perforate elastomeric member as defining a second fluid port of larger predetermined diametric extent.

Returning again to FIG. 1, the above-described fluid metering feature of the present invention is further illustrated in connection with exhaust side coolant port openings 36i–k which are shown to having associated ports 70i–k of varying diameters in contrast to intake side coolant port openings 36a–h which are shown as having associated ports 70a–h of generally uniform diameter. As may be seen with additional reference to FIGS. 5 and 6 wherein ports 36i and 36k are shown in cross-section, ports 70i–k are defined therein which progressively increase in diametric extent from the diameter $d_i$ of opening $36_i$ to the diameter $d_k$ of opening 36k. Thus, low pressure end opening 36k thereby is provided with a larger port 70k thereof for an increased fluid flow rate through its corresponding passageway as compared to the fluid flow rate through the passageway corresponding to opening 36i having a smaller port 70i. Apart from the representative arrangement illustrated, any number and sizes of ports 70 may be provided, as dependent upon the pressure profile within the particular engine of interest, to normalize the fluid flow rates therethrough for effecting a more isothermal cylinder head temperature distribution.

That the port size of each fluid port opening 28 is defined by the extents of the diaphragm portion 54 thereof rather than by the opening itself facilitates the economical manufacture of the gasket 10 of the present invention. In this regard, for certain engines which utilize two or more blocks, retainer members 12 therefor may be identically stamped or otherwise formed from a single blank. For example, a blank may be provided as having an arrangement of fluid port openings 28 which is symmetric about at least one axis of the gasket, for example the central axis referenced at 80 in FIG. 1. Ports 70 of the associated elastomeric members 14 thereafter may be molded, cut, or otherwise formed into the diaphragm portions 54 thereof in a separate operation. Accordingly, by reversing the retainer member about its axis of symmetry, gaskets may be fabricated for each side of the engine using one blank rather than two blanks which are configured as mirror-images.

Referring next to FIG. 7, shown generally at 100 is an operational view showing gasket 10 of the present invention as compresses between the mating interfaces surfaces, 102a and 102b, of a cylinder head and block, referenced respectively at 104 and 106, of an internal combustion engine. Cylinder head and block 104 and 106 are of the conventional construction described hereinbefore as having a plurality of cylinder bores, a corresponding pair of which are referenced at 108a and 108b, which mate to define combustion chamber 110. A piston, 112, having a peripheral seal ring, 114, is reciprocatingly received within chamber 110.

Additionally defined between head and block 104 and 106 are one or more throughbore passageways, a representative one of which is referenced at 116, for the flow of coolant and/or lubrication fluids through the engine. A plurality of threaded apertures, one of which is referenced at 118, are provided for a threaded engagement with a corresponding number of head bolts, one of which is referenced at 120, which fasten head 104 to block 106 and which are tightened to a predetermined torque to effect the compression of gasket 10 in a sealing engagement between interface surfaces 102.

Gasket 10 is disposed between interface surfaces 102 such that each of fluid port openings 28, cylinder bore openings 26, and bolt holes 40 are registered with, respectively, a corresponding fluid passageway 116, combustion chamber 110, and aperture 118 of the engine head and block. In this regard, is preferred that the outer periphery 52 of fluid port opening 28 is provided to be about 50–100 mils larger in diameter than the opening of passageway 116 to marginally offset seal portion 50 about 30–75 mils therefrom. Such offset accommodates the bearing of seal portion 50 on interface surfaces 102 as well as the deformation of the seal portion during compression.

Seal portion 50 is provided to be of a compressed width, referenced at w, which is effective for sealing about the periphery of passageways 116. Typically, such width w will be from about 40–90 mils, and will represent an increase of from about 10–15 mils as compared to its uncompressed width of about 30–75 mils. Depending upon the pressure of the fluid in passageways 116 and the thickness of diaphragm portion 54 of elastomeric member 14, it may be preferred to reinforce diaphragm portion against erosion from fluid flow. The reinforcement preferably is a provided as a thin metal disc or wire screen which is embedded into the diaphragm or is bonded or otherwise attached to the upstream side thereof which confronts the flow. Reinforcement of such type advantageously may be flashed or otherwise integrally incorporated into diaphragm portion 54 during the molding of the elastomeric members 14. Alternatively, the reinforcement may be provided as a fibrous or particulate metal or glass filler which is compounded with the elastomeric composition.

As is referenced at 150 and as is shown in enhanced at in FIG. 7A, seal portion 50 of elastomeric member 14 is compressed between interface surfaces 102 to a thickness $t_5$ which is equal to the thickness $t_3$ of retainer member 12. Port 70 of diaphragm portion 54 thereby is aligned in registration with passageway 116 effecting a pressure drop therewithin and a correspondingly decreased fluid flow rate. Such fluid metering feature additionally is illustrated in FIG. 7B wherein diaphragm portion 54 is shown at 150' to be provided as defining a port 70' of larger diametric extent for increased throughput, and in FIG. 7C at 150" wherein an imperforate diaphragm portion 54 is provided to effect the complete blockage of the flow of fluid through passageway 116.

Looking lastly to FIG. 7D, it may be seen at 160 that a fluid-tight sealing of combustion chamber 110 is effected by combustion ring portion 60 which circumscribes the cylinder bore opening 26 of retainer member 12. Such seal is realized via the compression of bearing surfaces 62 of combustion ring portion 60 from uncompressed thickness $t_4$ (FIG. 1) to a compressed thickness, $t_6$, which is equal to the thickness $t_3$ of the remainder of retainer member 12. As aforementioned, bearing surfaces 62 exhibit a reduced yield stress to be deformable for conforming to any irregularities between the interface surfaces 102 of cylinder head and block 104 and 106, and additionally providing an increased bearing stress for improved sealing about cylinder bore opening 26.

The combination of a metal retainer member 12 and elastomeric members 14 advantageously provides a gasket construction which minimizes torque loss and thereby obviates much of the need for the periodic retorquing of the head bolts. That is, it is well-known that head gaskets are prone to developing a compression set which is manifested by fluid leaks and/or a loss of engine compression and efficiency as the tension in the head bolts is relaxed and the fluid-tight sealing of combustion chambers and coolant passageways is compromised. In this regard, the provision of elastomeric members 14 ensures the positive sealing of the fluid passageways under relatively low seal or bearing stresses. Metal retainer member 12, in turn, synergistically provides metal-to-metal contact in establishing an alternative load torque path minimizing the compression set and leak potential of the gasket. The metal-to-metal contact provided by retainer member 12 additionally affords improved heat transfer between the cylinder head and block, and also develops relatively high seal stresses for the fluid-tight sealing of the combustion chambers of the engine.

As aforementioned, retainer member 12 may be formed as a metal stamping with cylinder bore openings 26 and fluid port openings 28 being die cut therein. For the attachment of elastomeric members 14 to openings 28 of retainer member 12, inner surfaces 58 (FIG. 2) thereof may be primed with a bonding agent such as Chemloc™ 607. The primed retainer then may be placed into a heated molded cavity for the injection of an uncured rubber compound forming integral seal and diaphragm portions 50 and 54 of elastomeric members 14. Each of the elastomeric members thereby may be formed and cured-in-place as vulcanized directly onto retainer member 12. Alternatively, the elastomeric members may be molded in a separate operation and bonded to retainer member 12 using an adhesive or the like. Irrespective of whether the elastomeric members are formed-in-place on the retainer member or separately attached thereto, it is preferred that each are initially formed as having an imperforate, i.e., full, diaphragm member which extends completely across the opening. Thereafter, depending upon whether the particular opening is to be ported or blocked completely, the diaphragm portion thereof may be die cut or the like to form a port opening of the desired diametric extent. As was detailed hereinbefore, such fabrication allows a single retainer blank to be used for both sides of a dual block engine.

Metal materials suitable for the construction of retainer member 12 include aluminum, steel, stainless steel, copper, brass, titanium, nickel, and alloys thereof, with aluminum being preferred for many applications. Elastomeric members 14 may be molded from a synthetic rubber, but will be selected specifically for high temperature performance or otherwise for compatibility with the fluid being handled. Suitable materials include thermoplastic or thermosetting synthetic rubbers such as SBR, polybutadiene, EPDM, butyl, neoprene, nitrile, polyisoprene, silicone, fluorosilicone, buna-N, copolymer rubbers, or blends such as ethylene-propylene rubber.

As it is anticipated that certain changes may be made in the present invention without departing from the precepts herein involved, it is intended that all matter contained in the foregoing description shall be interpreted in as illustrative rather than in a limiting sense. All references cited herein are expressly incorporated by reference.

What is claimed:

1. A gasket for interposition between the interface surfaces of a cylinder block of an internal combustion engine, the cylinder head and block having one or more cylinder bores defining combustion chambers of the engine, and one or more passageways for the flow of fluid through the cylinder head and block, said gasket comprising:

a metal retainer member having generally planar first and second surfaces with one or more cylinder bore openings and fluid port openings formed therethrough, said fluid port openings comprising a first fluid port opening defined by a first given outer periphery and at least one corresponding second fluid port opening defined by a second given outer periphery substantially the same configuration as said first given outer periphery, each of said cylinder bore openings being configured for registration with a corresponding combustion chamber, and each of said fluid port openings being configured for registration with a corresponding passageway; and elastomeric members attached to said retainer member about each of said fluid port openings, each of said elastomeric members having a seal portion extending along the given outer periphery of each fluid port opening for sealing the corresponding passageway thereof, and a diaphragm portion extending from said seal portion at least partially into an interior of each fluid port opening for covering at least a portion of the corresponding passageway, said elastomeric members including a first elastomeric member attached to said retainer member about said first fluid port opening and a second elastomeric member attached to said retainer member about each second fluid port opening, said diaphragm portion of said first elastomeric member being perforate and defining a first fluid port of a first predetermined diametric extent, and said diaphragm portion of each second elastomeric member being perforate and defining a second fluid port of a second diametric extent smaller than said first diametric extent effective to meter the flow of fluid through said second fluid port relative to the flow of fluid through said first fluid port.

2. The gasket of claim 1 wherein said retainer member is constructed of a metal material selected from the group consisting of aluminum, steel, stainless steel, copper, brass, titanium, nickel, and alloys thereof.

3. The gasket of claim 1 wherein each of said elastomeric members are formed of natural or synthetic rubber.

4. The gasket of claim 1 wherein said fluid port openings further include a third fluid port opening and wherein said elastomeric members further include a third elastomeric member attached to said retainer member about said third fluid port opening, said third elastomeric member having a diaphragm portion which is imperforate for blocking the flow of fluid through the corresponding passageway.

5. The gasket of claim 1 wherein the periphery of each given fluid port opening defines an inner surface, and wherein each of said elastomeric members is attached to said inner surface.

6. The gasket of claim 5 wherein said inner surface is stepped.

7. The gasket of claim 1 wherein said seal portion of each of said elastomeric members is thicker than said retainer member to be compressible between the interface surfaces of the cylinder head and block.

8. The gasket of claim 1 wherein said retainer member includes one or more integral combustion ring portions, each combustion ring portion describing an outer periphery of the corresponding cylinder bore opening, said combustion ring portions being compressible for compression between the interface surfaces of the cylinder head and block for sealing the corresponding combustion chamber.

9. The gasket of claim 8 wherein each of said combustion ring portions are configured as having at least one upstanding bearing surface extending from one of the planar surfaces of said retainer member.

10. The gasket of claim 9 wherein each of said combustion ring portions is further configured as having at least one channel recessed into the other one of the planar surfaces of said retainer member.

11. The gasket of claim 1 wherein said diaphragm portion of said elastomeric members is reinforced.

12. A gasket for interposition between the interface surfaces of a cylinder block of an internal combustion engine, the cylinder head and block having one or more cylinder bores defining combustion chambers of the engine, and one or more passageways for the flow of fluid through the cylinder head and block, said gasket comprising:

a metal retainer member having generally planar first and second surfaces with one or more cylinder bore openings and fluid port openings formed therethrough, said fluid port openings comprising a first fluid port opening defined by a first given outer periphery and at least one corresponding second fluid port opening defined by a second given outer periphery substantially the same configuration as said first given outer periphery, each of said cylinder bore openings being configured for registration with a corresponding combustion chamber, and each of said fluid port openings being configured for registration with a corresponding passageway; and elastomeric members attached to said retainer member about each of said fluid port openings, each of said elastomeric members having a seal portion extending along the given outer periphery of each fluid port opening for sealing the corresponding passageway thereof, and a diaphragm portion extending from said seal portion at least partially into an interior of each fluid port opening for covering at least a portion of the corresponding passageway, said elastomeric members including a first elastomeric member attached to said retainer member about said first fluid port opening and a second elastomeric member attached to said retainer member about each second fluid port opening, said diaphragm portion of said first elastomeric member being perforate and defining a first fluid port of a first predetermined diametric extent, and said diaphragm portion of each second elastomeric member being imperforate blocking the flow of fluid through the corresponding passageway of each second fluid port opening.

* * * * *